United States Patent
Cho

(10) Patent No.: US 10,386,038 B2
(45) Date of Patent: Aug. 20, 2019

(54) DIFFUSION LENS AND LIGHT EMITTING MODULE HAVING THE SAME

(71) Applicant: Molex, LLC, Lisle, IL (US)

(72) Inventor: Sung Kuk Cho, Ansan (KR)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 15/342,507

(22) Filed: Nov. 3, 2016

(65) Prior Publication Data

US 2017/0153005 A1   Jun. 1, 2017

(30) Foreign Application Priority Data

Nov. 26, 2015 (KR) .......................... 10-2015-0166512

(51) Int. Cl.
| | |
|---|---|
| F21V 5/04 | (2006.01) |
| F21V 19/00 | (2006.01) |
| G02B 19/00 | (2006.01) |
| F21Y 115/10 | (2016.01) |

(52) U.S. Cl.
CPC .......... *F21V 5/046* (2013.01); *F21V 19/0035* (2013.01); *G02B 19/0014* (2013.01); *G02B 19/0061* (2013.01); *F21Y 2115/10* (2016.08)

(58) Field of Classification Search
CPC .. G02B 19/0014; F21V 5/046; F21V 19/0035
See application file for complete search history.

(56) References Cited

U.S. PATENT DOCUMENTS

| | | | |
|---|---|---|---|
| 9,484,510 B2 | 11/2016 | Kim | |
| 2015/0055347 A1* | 2/2015 | Kim | H01L 33/58 362/293 |

FOREIGN PATENT DOCUMENTS

| | | |
|---|---|---|
| JP | 2009-117207 A | 5/2009 |
| WO | 2013/088556 A1 | 6/2013 |

OTHER PUBLICATIONS

Office Action received for Korean Patent Application No. 10-2015-0166512, dated Jun. 25, 2018, 9 pages (5 pages of English Translation and 4 pages of Official Copy).

* cited by examiner

*Primary Examiner* — Anabel Ton
(74) *Attorney, Agent, or Firm* — Molex, LLC

(57) ABSTRACT

A light emitting module is provided that has a diffusion lens that both reduces lens radius and renders uniform light luminance by preventing luminance non-uniformities caused by lens radius reduction. The light emitting module includes a circuit board, a light emitting device mounted on the circuit board, and a diffusion lens that controls the light emitted from the light emitting device and is installed on the circuit board so as to be located above the light emitting device.

7 Claims, 7 Drawing Sheets

DIFFUSION LENS AND LIGHT EMITTING MODULE HAVING THE SAME

RELATED APPLICATIONS

This application claims priority to Korean Application No. 10-2015-0166512, filed Nov. 26, 2015, which is incorporated herein by reference in its entirety.

TECHNICAL FIELD

This disclosure relates to a light emitting module, and more specifically to a diffusion lens that enables uniform luminance of emitted light and to a light emitting module emitting light having the same.

BACKGROUND ART

Typically, in a light emitting module for backlighting or sidelighting a liquid crystal display, a light emitting device is mounted on a circuit board, and the light emitted from the light emitting device is dispersed and emitted at a wide angle via a lens. Using such a lens, a wide area may be uniformly illuminated with a small number of light emitting devices, by evenly dispersing the light emitted by the light emitting devices.

Recently, there has been a need to reduce the diameters of the lenses of light emitting modules due to the trend toward miniaturization, and flange parts have been formed on the light emitting surface in order to reduce the lens diameter.

However, in the prior art, luminance non-uniformity (mura) has occurred at the flange part when light diffused by the upwardly-sloping surface or flat surface formed on the back side (lower surface) of the lens is emitted toward the flange part, and as a result there has been a problem of non-uniform luminance.

Patent Reference 0001: Republic of Korea Unexamined Patent Publication 10-2015-0082394 (published 2015.07.15)

SUMMARY

The technical task of this disclosure is to provide a light emitting module comprising a diffusion lens that both reduces lens radius and renders uniform light luminance by preventing luminance non-uniformities caused by lens radius reduction.

The diffusion lens according to one embodiment of this disclosure, in order to achieve the task, comprises a light incidence part that forms an inner surface where light emitted from a light emitting device is incident, a light emission part that forms an outer surface where light incident on the light incidence part is emitted, and furnishes a flange part that breaks the curvature of the emission side at the end so that the diameter of the lens is reduced, and an back-side part that forms a lens lower surface that connects the light incidence part and light emission part and furnishes a 1st sloped surface that is formed sloping upward from the light incidence part, and a 2nd sloped surface that is formed sloping downward from the end of the 1st sloped surface; because the light diffused by the 2nd sloped surface of the back-side part offsets light emitted from the flange part, luminance may be rendered uniform so as to prevent non-uniformities at the flange part.

In addition, the inflection point between the 1st sloped surface and the 2nd sloped surface may be formed at 80±10% of the total lens radius.

In addition, the 2nd sloped surface may be formed at a downward sloping angle of 10° or less with respect to the horizontal.

In addition, the flange part may comprise: a 1st inflection point where the curvature of the emission surface is broken at the end of the light emission part; and a 2nd inflection point that is formed at a certain angle away from the 1st inflection point along the emission surface so as to increase the diffusion angle; and the 1st inflection point and the 2nd inflection point may be located on the horizontal of the back-side part formed on the 2nd sloped surface.

In addition, the slope angle between the 1st inflection point and the 2nd inflection point may be 5° or less relative to the vertical.

In addition, the light emitting module according to one embodiment of this disclosure may comprise: a circuit board; a light emitting device mounted on the circuit board; and a diffusion lens that controls the light emitted from the light emitting device and is installed on the circuit board so as to be located on top of the light emitting device.

This disclosure enables the prevention of luminance non-uniformities (mura) on the flange part, by making luminance uniform by offsetting the light emitted by the flange part with the light diffused from the downward-sloping surface of the lens back-side part.

Accordingly, this disclosure has the effect that it may prevent the occurrence of luminance non-uniformity (mura), which occurs at the inflection point of the flange part when the curvature of the emitting surface is broken in order to reduce lens diameter, by rendering the luminance uniform by offsetting the light by means of the shape of the back-side part.

DETAILED DESCRIPTION OF THE PREFERRED EMBODIMENTS

Hereinbelow, the diffusion lens and light emitting module having the same according to an embodiment of the present disclosure will be described, with reference to the attached drawings. Please note that in describing this disclosure, the detailed explanation is omitted of functions and components which are common knowledge and are judged to unnecessarily obscure the core intent of the disclosure.

Figure 1:
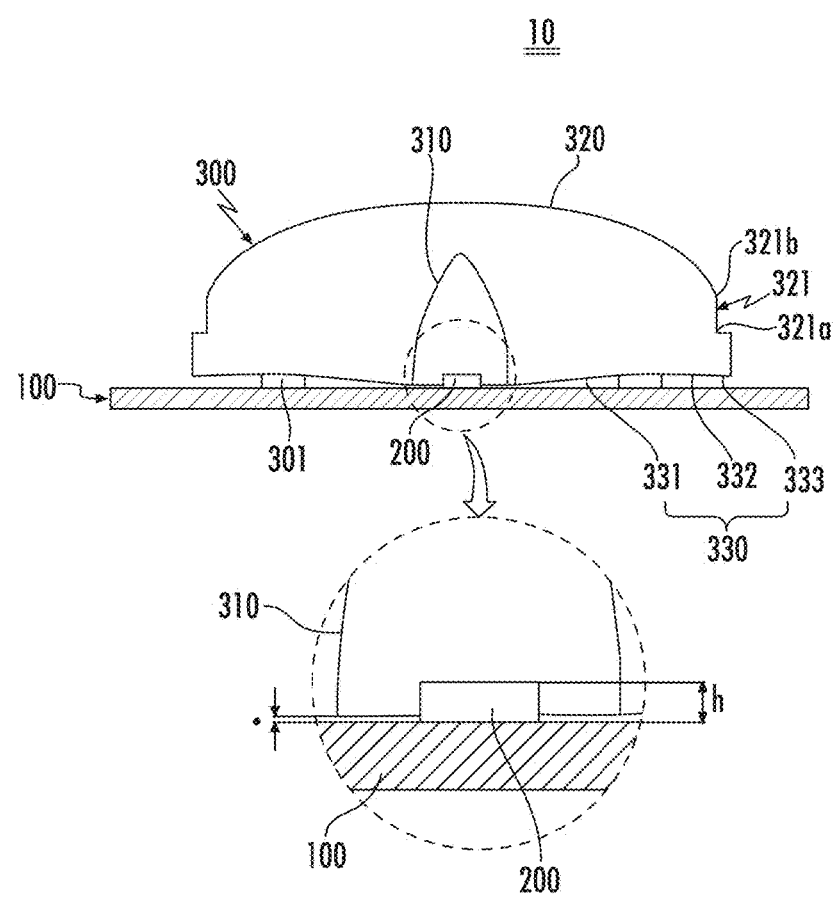
FIG. 1 is a schematic cross-section illustrating the light emitting module according to one embodiment of this disclosure.
Figure 2:
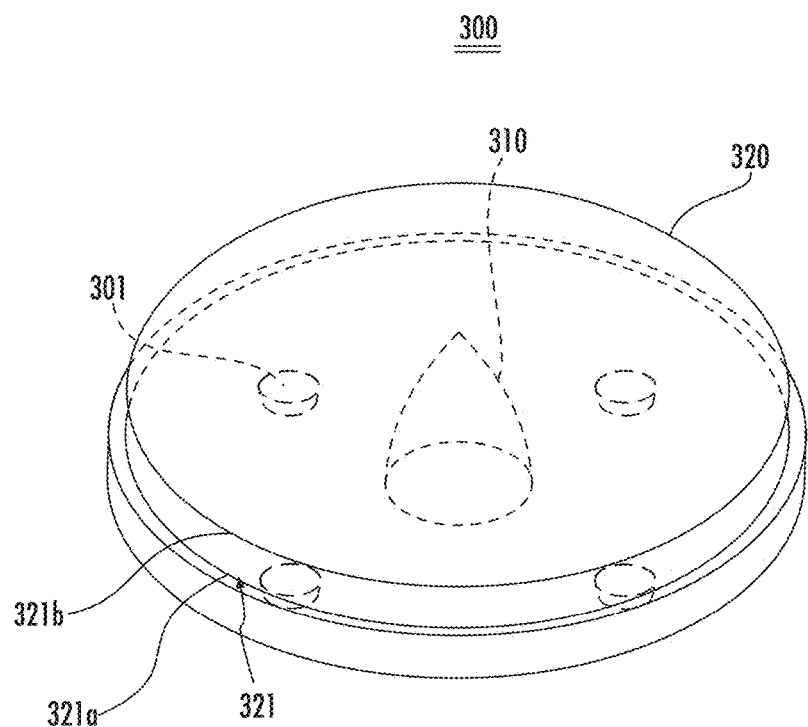
FIG. 2 is a perspective view of a diffusion lens used in a light emitting module according to one embodiment of this disclosure.
Figure 3:
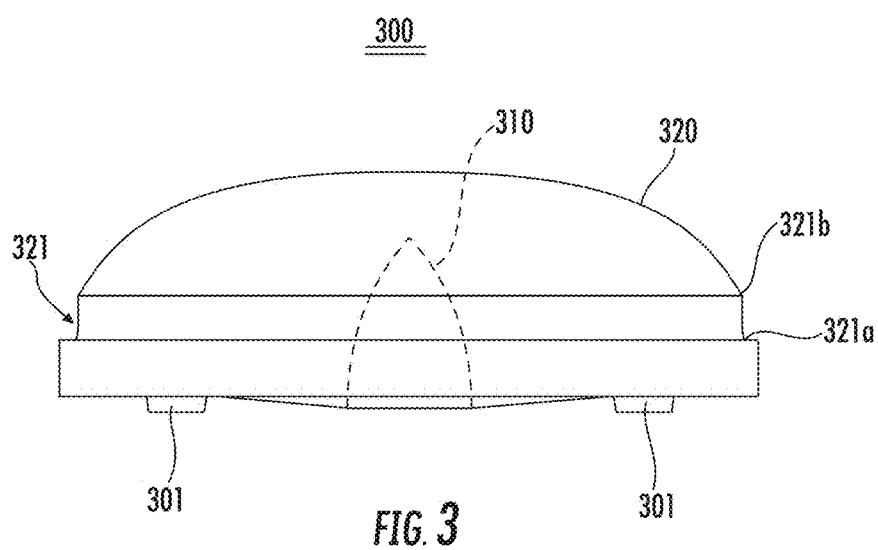
FIG. 3 is a frontal view of a diffusion lens used in a light emitting module according to one embodiment of this disclosure.
Figure 4:
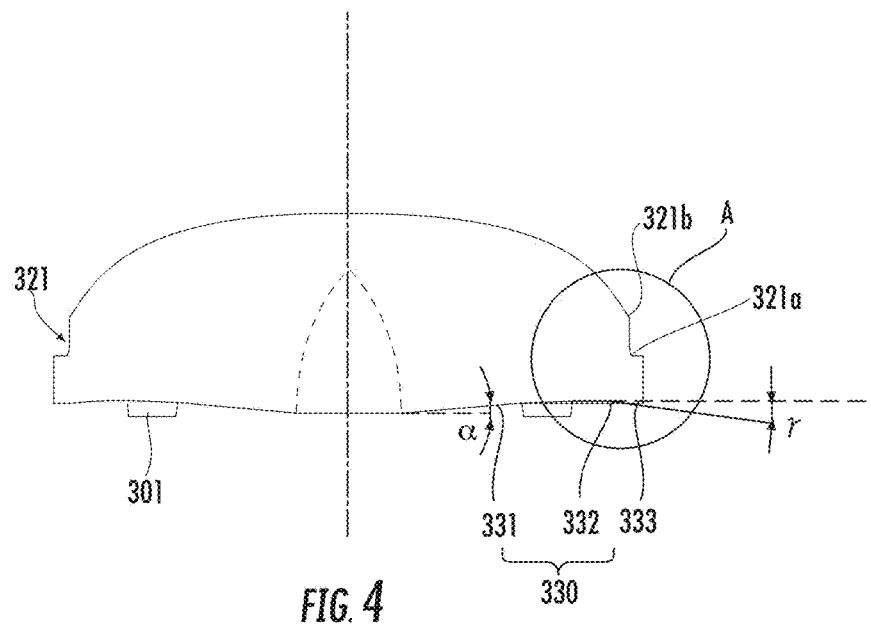
FIG. 4 is a schematic cross-section illustrating a diffusion lens used in a light emitting module according to one embodiment of this disclosure.
Figure 5:
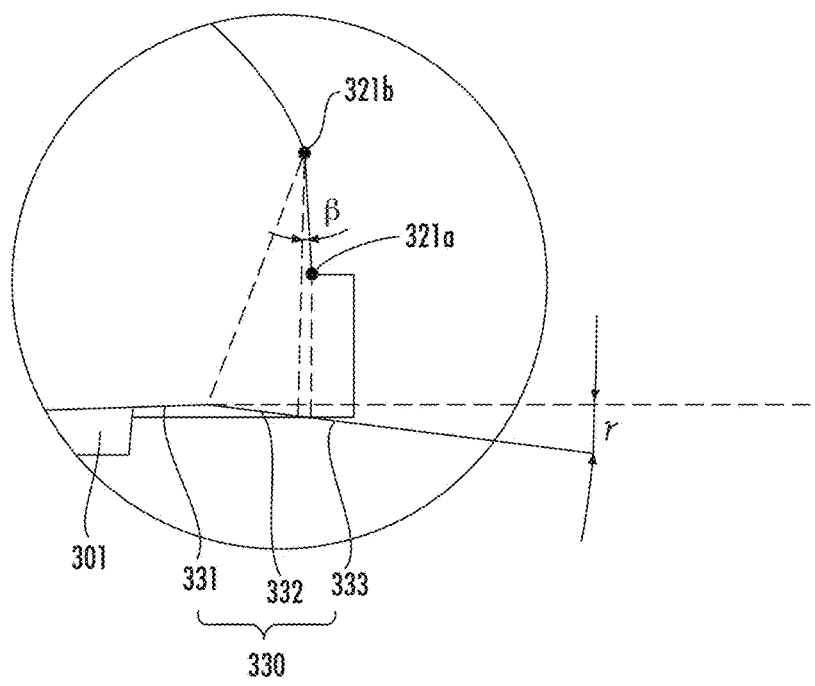
FIG. 5 is an expanded view of Part A of FIG. 4.

As shown in FIG. 1, the light emitting module 10 according to one embodiment of this disclosure may comprise a circuit board 100, light-emitting device 200 and diffusion lens 300.

The circuit board 100 is a printed circuit board (PCB) whereon a circuit pattern is formed. Here, although a single light emitting device 200 is depicted as being mounted on the circuit board 100, a plurality of light emitting devices 200 may be arranged on the circuit board 100, and a diffusion lens 300 may be placed above each light emitting device 200.

The light emitting device 200 is mounted on the circuit board 100. The light emitting device 200 is placed inside the below-described light incidence part 310. The light emitting device 200 may be configured as an LED package consisting of a light emitting diode (LED) chip. Such an LED package is a widely-known technology and therefore understandable, and a detailed description is accordingly omitted.

The diffusion lens 300 serves to control the light emitted from the light emitting device 200.

The diffusion lens 300 is installed on the circuit board 100 in such a way as to be located above the light emitting device 200.

The diffusion lens 300 is held in place by a plurality of leg parts 301 being coupled to the circuit board 100. For example, the respective front ends of the leg parts 301 of the diffusion lens 300 may be adhered to the circuit board 100 by an adhesive, or may be fitted into holes (not shown) formed on the circuit board 100. In addition, in this embodiment the configuration has been depicted in which the lens leg parts 301 are four (4) in number, but this is not limiting and the leg parts 301 may also be configured as three (3). In addition, the lens leg parts 301 may be formed on the 1st sloped side 331 or 2nd sloped side 332 of the back-side part 330.

As shown in FIGS. 2 through 5, the diffusion lens 300 used in the light emitting module 10 according to one embodiment of this disclosure may comprise a light-incidence part 310, light emitting part 320, and back-side part 330.

The light-incidence part 310 forms an inner surface on which light emitted from the light emitting device 200 is incident on the interior of the lens.

The light-incidence part 310 may have a form in which the width thereof becomes narrower moving upward from the entrance. In addition, the entrance width of the light-incidence part 310 may be greater than the width of the light emitting device 200.

The height of the light-incidence part 310 may be regulated according to the orientation angle of the light emitting device 200, the shape of the lens upper surface, the desired light orientation distribution, etc.

The light emitting part 320 forms an outer surface of the lens that emits light that is incident on the light incidence part 310.

The shape of the emitting surface of the light emitting part 320 is formed with a convex ring shape or with flattened curvature.

The light emitting part 320 may be furnished with a flange part 321 that reduces the diameter of the lens by breaking the curvature of the emitting surface at the end thereof.

The flange part 321 may comprise a 1st inflection point 321a and a 2nd inflection point 321b.

The 1st inflection point 321a serves to reduce the diameter of the lens by breaking the curvature of the emitting surface at the end of the light emitting part 320.

The 2nd inflection point 321b serves to increase the diffusion angle and is formed at a certain angle away from the 1st inflection point 321a along the emitting surface.

The 1st inflection point 321a and 2nd inflection point 321b are located on the perpendicular of the back-side part 330 whereon the 2nd sloped surface 332 is formed.

The slope angle β between the 1st inflection point 321a and 2nd inflection point 321b is formed so as to be 5° or less relative to the perpendicular. For example, the slope angle β formed between the line connecting the 1st inflection point 321a and 2nd inflection point 321b, and the perpendicular at the 2nd inflection point 321b, is 5° or less.

The back-side part 330 forms a lower lens surface connecting the light incidence part 310 and the light emission part 320.

The back-side shape of the back-side part 330 is formed at a certain angle and curvature so as to regulate the reflected light. By this means, the light incident on the back-side part 330 may be refracted so as to expand the diffusion range.

The back-side part 330 may be furnished with a 1st sloped surface 331 formed sloping upward from the light-incidence part 310, and a 2nd sloped surface 332 formed sloping downward from the end of the 1st sloped surface 331. In addition, the back-side part 330 may either comprise or not comprise a surface 333 that extends flat from the 2nd sloped surface 332 to the outer edge.

The inflection point R3 between the 1st sloped surface 331 and 2nd sloped surface 332 is formed at 80±10% of the total lens radius R1. In other words, in the back-side part 330, the inflection point R3 of the 2nd sloped surface 332 is located within the range of 80±10% of the total lens radius R1.

The 1st sloped surface 331 starts from the end of the light-incidence part 310, and is formed at a slope angle α of 10° or less above the horizontal.

The 2nd sloped surface 332 is formed at a slope angle γ of 10° or less below the horizontal.

The occurrence of luminance non-uniformity at the flange part 321 may be prevented by offsetting the light emitted from the flange part 321 with light diffused by the 2nd sloped surface 332, which is the downwardly-sloping surface of the back-side part 330, so as to render luminance uniform. In other words, luminance non-uniformity occurs at the inflection points 321a, 321b of the flange part 321 when the curvature of the emitting surface is broken in order to reduce lens diameter, and this is offset with light from the shape of the back-side part 330 so as to render the luminance uniform and prevent the occurrence of luminance non-uniformity.

Figure 6:
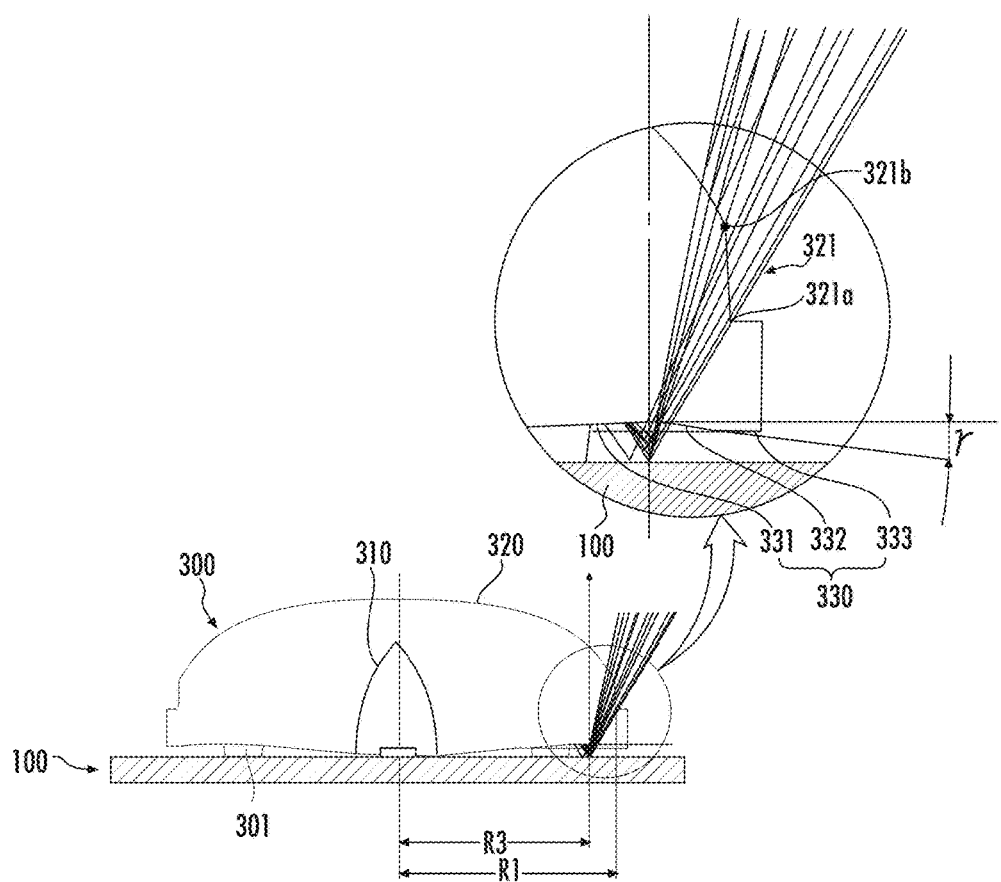
FIGS. 6 and 7 are schematic views comparing the light emission from the flange part of the light emitting part at different slope angles of the downward-sloping surface formed on the back-side part of the diffusion lens.
Figure 7:
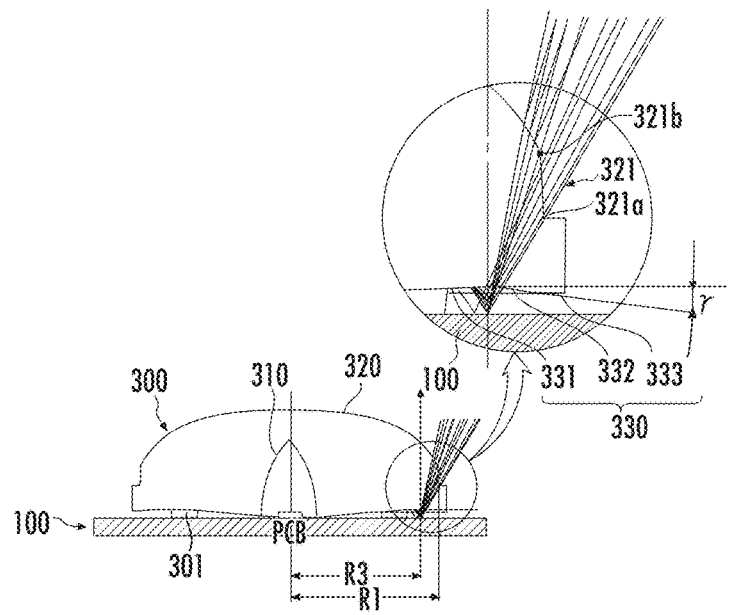

FIGS. 6 and 7 are schematic views comparing the light emission from the flange part 321 of the light emitting part 320 at different slope angles of the downward-sloping surface 332 formed on the back-side 330 part of the diffusion lens 300.

As shown in FIG. 6, if the slope angle γ of the downward-sloping 2nd sloped surface 332 of the back-side part 330 is formed at 0-10°, then within the range between the 1st inflection point 321a and 2nd inflection point 321b emitted light is refracted within the lens radius, and beyond the 2nd inflection point 321b the emitted light is refracted outside the lens radius.

In this way, the emitted light refracted inside the lens radius at the flange part 321 and the emitted light refracted outside the lens radius offset each other so that the occurrence of mura (luminance non-uniformity) is reduced and luminance is rendered uniform.

However, as shown in FIG. 7, if the slope angle γ of the downward-sloping 2nd sloped surface 332 of the back-side part 330 is greater than 10°, e.g. 11°, then within the range between the 1st inflection point 321a and 2nd inflection point 321b emitted light is refracted outside the lens radius, and beyond the 2nd inflection point 321b the emitted light is also refracted outside the lens radius.

In this way, all light emitted from the flange part 321 is refracted outside the lens radius, and is not offset, so that the occurrence of mura increases and luminance becomes non-uniform.

Figure 8:
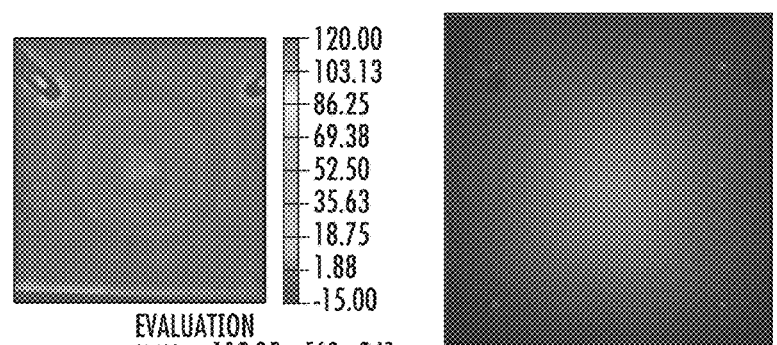
FIGS. 8 and 9 are experimental photographs comparing the presence or absence of light non-uniformities (mura) at the flange part of the light emitting part at different slope angles of the downward-sloping surface formed on the back-side part of the diffusion lens.
Figure 9:
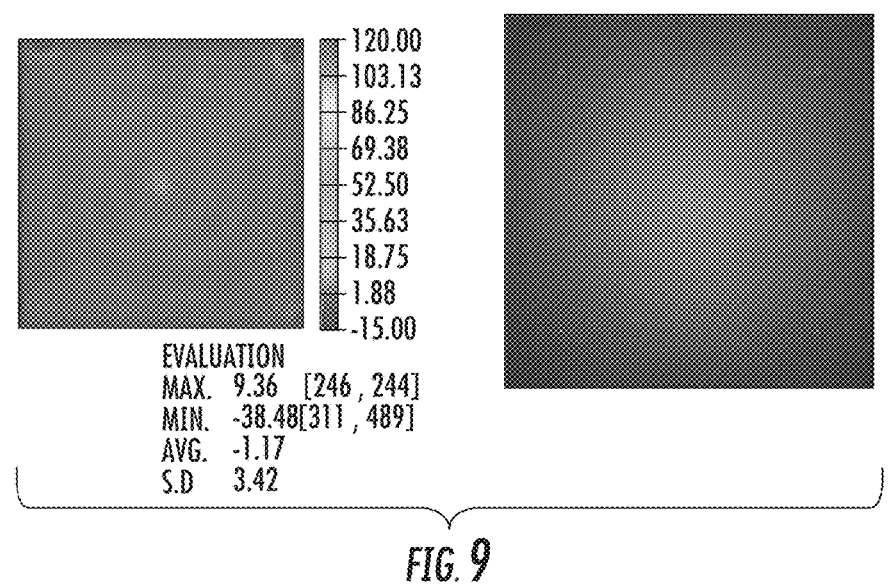

FIGS. 8 and 9 are experimental photographs comparing the presence or absence of light non-uniformities (mura) at the flange part 321 of the light emitting part 320 at different slope angles of the downward-sloping surface 332 formed on the back-side part 330 of the diffusion lens 300.

Figure 10:
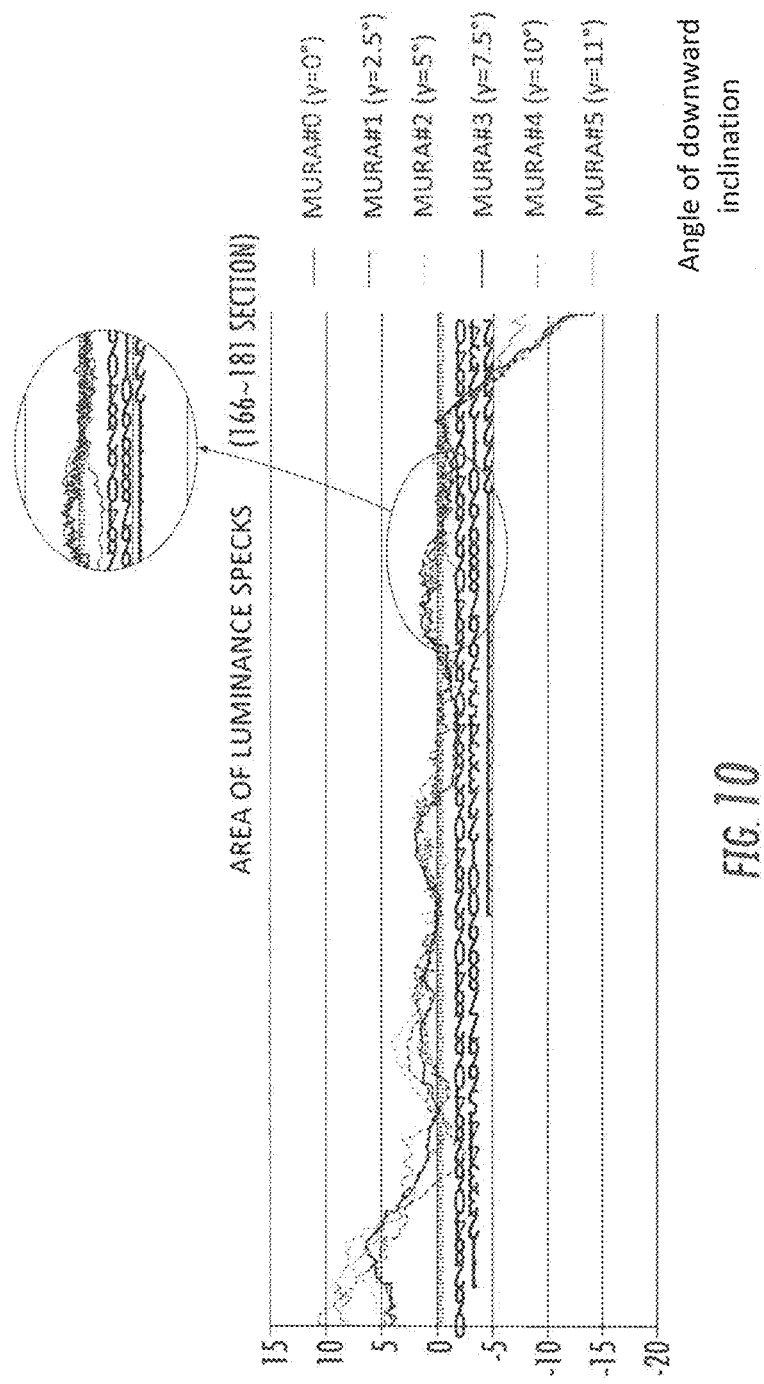
FIG. 10 is a graph comparing the regions of occurrence of light non-uniformities (mura) at the flange part of the light emitting part at different slope angles of the downward-sloping surface formed on the back-side part of the diffusion lens.

As shown in FIG. 10, there is a substantial difference in the sections in which luminance non-uniformity (mura) occurs (sections 166-181) at the flange part of the light emitting part, for different slope angles of the 2nd sloped face 332 which is the downward-facing sloped surface of the back-side part 330 (γ=0°, y=2.5°, γ=5°, γ=7.5°, γ=10°, γ=11°). Specifically, in sections 166-181 where luminance non-uniformity (mura) occurs, if the slope angle γ of the downward-sloping surface 332 of the back-side part 330 is 0-10°, the luminance will be uniform, while if the slope angle γ of the downward-sloping surface 332 of the back-side part 330 is greater than 10°, e.g. 11°, the luminance is non-uniform.

As shown in Table 1 below, as the mura value approaches zero (0), the light is increasingly uniform, and in the 0-10° distribution of the slope angle γ of the downward-sloping surface 332 of the back-side part 330, the mura value approaches zero (0) so that luminance is uniform without any change in mura, while if the slope angle γ of the downward-sloping surface 332 of the back-side part 330 exceeds 10°, the mura value abruptly falls, indicating non-uniform luminance.

TABLE 1

| | Sections with MURA | 166 | 167 | 168 | 169 | 170 | 171 | 172 | 173 | 174 |
|---|---|---|---|---|---|---|---|---|---|---|
| MURA VALUE | MURA #0 Downward sloping angle (γ = 0°) | 0.7319 | 1.4395 | 1.4341 | 1.0491 | 1.3402 | 1.4424 | 1.2091 | 0.949 | 0.7263 |
| | MURA #1 Downward sloping angle (γ = 2.5°) | 0.7319 | 1.4395 | 1.4341 | 1.0491 | 1.3402 | 1.4424 | 1.2091 | 0.949 | 0.7263 |
| | MURA #2 Downward sloping angle (γ = 5°) | 0.2034 | 0.9221 | 0.6347 | 0.3171 | 1.1325 | 1.1114 | 1.3079 | 1.1403 | 1.1415 |
| | MURA #3 Downward sloping angle (γ = 7.5°) | 0.9221 | 0.6347 | 0.3171 | 1.1325 | 1.1114 | 1.3079 | 1.1403 | 1.1415 | 1.5367 |
| | MURA #4 Downward sloping angle (γ = 10°) | 0.0576 | 0.8126 | 0.4034 | −0.3488 | −0.0842 | 0.6226 | 0.6688 | 0.4031 | 0.325 |
| | MURA #5 Downward sloping angle (γ = 11°) | −2.359 | −1.6481 | −1.9309 | −2.5312 | −2.0421 | −2.1885 | −2.241 | −2.367 | −2.1597 |

| | Sections with MURA | 175 | 176 | 177 | 178 | 179 | 180 | 181 |
|---|---|---|---|---|---|---|---|---|
| MURA VALUE | MURA #0 Downward sloping angle (γ = 0°) | 1.1913 | 0.8113 | 0.4651 | 0.0607 | −0.2247 | 0.3636 | 0.152 |
| | MURA #1 Downward sloping angle (γ = 2.5°) | 1.1913 | 0.8113 | 0.4651 | 0.0607 | −0.2247 | 0.3635 | 0.152 |
| | MURA #2 Downward sloping angle (γ = 5°) | 1.5367 | 1.5825 | 1.1556 | 0.7146 | 1.0297 | 0.8284 | 0.8118 |
| | MURA #3 Downward sloping angle (γ = 7.5°) | 1.5825 | 1.1556 | 0.7146 | 1.0297 | 0.8284 | 0.8118 | 0.6696 |
| | MURA #4 Downward sloping angle (γ = 10°) | 1.3607 | 1.134 | 0.9933 | 0.6576 | −0.0416 | 0.5264 | 1.0846 |
| | MURA #5 Downward sloping angle (γ = 11°) | −2.5458 | −2.1677 | −2.0987 | −2.4604 | −1.5212 | −1.9756 | −1.4458 |

As shown in FIG. 8, if the slope angle γ of the downward sloping 2nd sloped surface 332 of the back-side part 330 is greater than 10°, e.g. 11°, the evaluation value in sections 166-181 is Max=112.35, Min=−68.79, Avg=−1.53, which is other than zero (0) and indicates uniformed luminance.

However, as shown in FIG. 9, in this disclosure, if the slope angle γ of the downward sloping 2nd sloped surface 332 of the back-side part 330 is formed so as to be 0-10°, then in the same sections 166-181 as in FIG. 8, the evaluation values are smaller than in FIG. 8, specifically Max=9.36, Min=−38.48, Avg=−1.17, which approaches zero (0) and indicates that the luminance is made uniform.

FIG. 10 is a graph comparing the regions of occurrence of light non-uniformities (mura) at the flange part 321 of the light emitting part 320 at different slope angles of the downward-sloping surface 332 formed on the back-side part 330 of the diffusion lens 300.

Accordingly, this disclosure may prevent the occurrence of luminance non-uniformity (mura) that occurs at the inflection point of the flange part when the curvature of the emitting surface is broken in order to reduce lens diameter, by rendering the luminance uniform by the light diffused by the setting of the downward-sloping surface slope angle offsetting the light emitted from the flange part.

Hereinabove, embodiments of this disclosure were described with reference to the attached drawings, but a person of ordinary ability in the art to which this disclosure pertains will be able to understand that this disclosure can be implemented in different specific forms without altering the necessary characteristics or technical idea thereof. Therefore, it must be understood that the above-described embodiments are illustrative and non-limiting in all respects. The scope of this disclosure is set forth in the claims below rather than in the detailed description; all alterations or altered forms derived from the meaning and scope and equivalents of the claims must be considered to be included within the scope of this disclosure.

The invention claimed is:

1. A diffusion lens that controls the emission of light from a light emitting device, comprising:
   a light incidence part that forms an inner surface whereonto light emitted from the light emitting device is incident;
   a light emission part that forms an outer surface that emits light that is incident on the inner surface, the light emission part having a curved part and a flange part, wherein the flange part has an upper portion that reduces lens radius by breaking a curvature of the outer surface of the curved part at an end thereof; and
   a back-side part that forms a lower surface that connects the light incidence part and the light emission part, the back-side part having a $1^{st}$ sloped surface and a $2^{nd}$ sloped surface, the $1^{st}$ sloped surface sloped upward from the light incidence part, the $2^{nd}$ sloped surface sloped downward at an end of the $1^{st}$ sloped surface,
   wherein the light diffused by the $2^{nd}$ sloped surface offsets and thereby renders uniform the light emitted from the upper portion of the flange part, thus preventing luminance non-uniformity at the upper portion of the flange part.

2. The diffusion lens according to claim 1, wherein an inflection point at which the $2^{nd}$ sloped surface begins is formed at 80±10% of a total radius of the diffusion lens.

3. The diffusion lens according to claim 2, wherein the $2^{nd}$ sloped surface is formed at a downward angle of 10° relative to horizontal.

4. The diffusion lens according to claim 1, wherein the upper portion of the flange part upper portion of the flange part angularly extends from a $1^{st}$ inflection point provided proximate to the back-side part to a $2^{nd}$ inflection point, the $2^{nd}$ inflection point being located where the upper portion of the flange part meets the curved part.

5. The diffusion lens according to claim 4, wherein a slope angle between the $1^{st}$ inflection point and the $2^{nd}$ inflection point is 5° or less relative to vertical.

6. A light emitting module comprising:
   a circuit board;
   a light emitting device mounted on the circuit board; and
   a diffusion lens according to claim 1, the diffusion lens being configured to control light emitted from the light emitting device, the diffusion lens being installed on the circuit board so as to be located on top of the light emitting device.

7. The diffusion lens according to claim 1, wherein the flange part has a lower portion having an increased diameter as compared to the upper portion of the flange part.

* * * * *